United States Patent
Scott et al.

(10) Patent No.: US 11,121,882 B2
(45) Date of Patent: Sep. 14, 2021

(54) BLINDING TECHNIQUES FOR PROTECTION OF PRIVATE KEYS IN MESSAGE SIGNING BASED ON ELLIPTIC CURVE CRYPTOGRAPHY

(71) Applicant: EMC IP Holding Company LLC, Hopkinton, MA (US)

(72) Inventors: Christopher Ronald Scott, Caboolture (AU); Aaron Matthew Marks, Boondall (AU); Eric Young, Annerley (AU); Sean Francis Parkinson, Indooroopilly (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 16/521,995

(22) Filed: Jul. 25, 2019

(65) Prior Publication Data

US 2021/0028946 A1    Jan. 28, 2021

(51) Int. Cl.
*H04L 9/32* (2006.01)
*G06F 7/58* (2006.01)

(52) U.S. Cl.
CPC ............. *H04L 9/3252* (2013.01); *G06F 7/58* (2013.01); *H04L 9/3257* (2013.01); *H04L 9/3263* (2013.01)

(58) Field of Classification Search
CPC ..... H04L 9/32; H04L 9/00; H04L 9/08; H04L 9/3263; H04L 9/3252; H04L 9/3257; H04L 9/0841; H04L 9/002; H04L 9/3218; H04L 9/0869; H04L 9/0816; H04L 9/3066; H04L 9/3013; H04L 9/065; H04L 9/003;

(Continued)

(56) References Cited

U.S. PATENT DOCUMENTS 7,961,874 B2 *  6/2011  Ibrahim ................ H04L 9/3013
                                                            380/28
8,738,927 B2 *  5/2014  Hubert .................... H04L 9/003
                                                            713/189

(Continued)

OTHER PUBLICATIONS

Scott Fluhrer, Scalar Blinding on Elliptic Curves with Special Structure, Cisco System, Aug. 11, 2015.

(Continued)

*Primary Examiner* — Thanhnga B Truong
(74) *Attorney, Agent, or Firm* — Ryan, Mason & Lewis, LLP

(57) ABSTRACT

Techniques are provided for protection of private keys in message signing based on elliptic curve cryptography. One method comprises obtaining a private key to generate a signature for a message; selecting a random integer as an internal private key in a predefined range based on an elliptic curve order; computing an internal public key as an elliptic curve point using a scalar multiply operation based on (i) the internal private key blinded using a random blinding value, (ii) an elliptic curve base point, and (iii) an inverse value for the random blinding value added to a result of the scalar multiply operation; generating a first signature portion based on the elliptic curve point; generating a second signature portion based on an inverse of the selected random integer generated from a message-dependent value and the first signature portion; and forming a signed message using the first and second signature portions.

20 Claims, 7 Drawing Sheets

(58) Field of Classification Search
CPC .. H04Q 5/22; H04K 1/00; G06F 21/62; G06F 11/30; G06F 7/58; G06F 7/725
See application file for complete search history.

(56) References Cited

U.S. PATENT DOCUMENTS

| | | | | |
|---|---|---|---|---|
| 8,766,778 | B2* | 7/2014 | Brown | H04L 9/3252 340/10.4 |
| 8,775,813 | B2* | 7/2014 | Brown | H04L 9/3252 713/176 |
| 8,972,738 | B2* | 3/2015 | Little | H04L 9/3252 713/180 |
| 2013/0246785 | A1* | 9/2013 | Buckley | H04W 12/106 713/156 |
| 2013/0247230 | A1* | 9/2013 | Parann-Nissany | H04L 9/008 726/30 |

OTHER PUBLICATIONS

Junfeng Fan et al., State-of-the-art of Secure ECC Implementations: A Survey on Known Side-Channel Attacks and Countermeasures, 2010 IEEE International Symposium on Hardware-Oriented Security and Trust (HOST).

Werner Schindler et al., Efficient Side-Channel Attacks on Scalar Blinding on Elliptic Curves with Special Structure, Bundersamt fur Sicherheit in der Informationstechnik, Gaithersburg, Jun. 12, 2015.

Margaret Rouse, Elliptical Curve Cryptography (ECC), What is Elliptical Curve Cryptography (ECC)?—Definition from WhatIs. com, Sep. 2005.

Wikipedia, Timing Attack, https://en.wikipedia.org/wiki/Timing_attack, May 27, 2019.

Wikipedia, Elliptic Curve Digital Signature Algorithm, https://en.wikipedia.org/wiki/Elliptic_Curve_Digital_Signature_Algorithm, Jul. 5, 2019.

T. Pornin, "Deterministic Usage of the Digital Signature Algorithm (DSA) and Elliptic Curve Digital Signature Algorithm (ECDSA)," Request for Comments: 6979 (Aug. 2013) (downloadable from https://www.ietf.org/rfc/rfc6979.txt).

Accredited Standards Committee X9, American National Standard X9, 62-2005, Public Key Cryptography for the Financial Services Industry, The Elliptic Curve Digital Signature Algorithm (ECDSA), Nov. 16, 2005.

Chwei-Shyong Tsai et al., Blind Signature Scheme Based on Elliptica Curve Cryptography, Published 2012.

* cited by examiner

1. Select a random integer $k$, $1 <= k <= n-1$
   A. Compute next blinding value: $i_N = i_{N-1} * 2 \mod n$
   B. Compute next blinding inverse: $I_N = I_{N-1} * 2$
   C. Compute blinded private scalar: $k_b = k + i_N \mod n$
   D. Compute blinded public value: $Q_b = k_b * G$
2. Compute $kG = Q_b + I_N = (x_1, y_1)$ and convert $x_1$ to an integer $x_1$.
3. Compute $r = x_1 \mod n$. If $r = 0$ go to step 1.
4. Compute $k^{-1} \mod n$.
5. Compute $DIGEST(m)$ and convert this bit string to an integer $e$.
6. Compute $s = k^{-1}(e + dr) \mod n$. If $s = 0$ then go to step 1.
7. Signature for the message $m$ is $(r, s)$.

1. An Initial Blinding Value is selected by picking a random number $i > 0$ and < the EC order, $n$, minus one.

Initial Blinding Inverse Point, $I_1$, is calculated by negating the result of the EC base point $G$, multiplied with the initial blinding value $i$:
   $I_1 = (G * i)^{-1}$ where $G$ is the curve's base point, and $i$ is the initial blinding value. * denotes scalar multiplication.

2. Next Blinding Values may be generated randomly by following step 1 again, or by deriving new blinding values from the initial values. Derived blinding values are obtained by "squaring" the initial values. For ECC, this is performed by doubling the scalar and point values in their respective fields:

Next Blinding Value, $i_{N+1}$, is calculated by taking the current blinding value multiplied by two, modulo $n$:
   $i_{N+1} = i_N * 2 \bmod n$ Next Blinding Inverse Point, $I_{N+1}$, is calculated by doubling the existing blinding inverse point using ECC scalar multiplication:
   $I_{N+1} = I_N * 2$

FIG. 5

BLINDING TECHNIQUES FOR PROTECTION OF PRIVATE KEYS IN MESSAGE SIGNING BASED ON ELLIPTIC CURVE CRYPTOGRAPHY

FIELD

The field relates generally to network communications, and, more particularly, to techniques for verification of messages transmitted through a communication network.

BACKGROUND

Electronic messages are often sent and received over communication networks. A receiver of an electronic message may wish to verify an authenticity of the electronic message using message signing techniques. Generally, message signing techniques typically determine if a message is authentic (e.g., whether the party alleging to be the sender of the message is actually the party that sent the message) and whether the message has been compromised (e.g., whether the contents of the received message have been altered). There are a number of existing message signing techniques, such as the Elliptic Curve Digital Signature Algorithm.

A need exists for improved techniques for protecting private keys used in message signing based on elliptic curve cryptography.

SUMMARY

In one embodiment, a method comprises obtaining a private key of a message signer to generate a signature for a message; selecting a random integer as an internal private key in a predefined range based on an order of an elliptic curve; computing an internal public key as a point on the elliptic curve using a scalar multiply operation based on (i) the internal private key blinded using a random blinding value, (ii) a base point of the elliptic curve, and (iii) an inverse value for the random blinding value added to a result of the scalar multiply operation; generating a first part of the signature for the message based on the point of the elliptic curve; generating a second part of the signature for the message based on an inverse of the selected random integer generated from a message-dependent value of the message and the first part of the signature; and forming a signed version of the message using the first part of the signature and the second part of the signature.

In some embodiments, the computing further comprises computing a next blinding value, $i_N$, based on a doubling of a prior blinding value, $i_{N-1}$; and computing a next blinding inverse value, $I_N$, for the next blinding value based on a doubling of a prior blinding inverse value, $I_{N-1}$. The computing may also comprise blinding the internal private key based on an addition of the next blinding value, $i_N$, to the internal private key.

In one or more embodiments, the generating the first part of the signature for the message based on the point of the elliptic curve applies an operation to an integer version of one coordinate of the point of the elliptic curve; and/or generating the second part of the signature for the message further comprises multiplying the first part of the signature by a private key of the message signer and adding a result to the message-dependent value of the message.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for a message signing process based on elliptic curve cryptography with the disclosed techniques for protection of private keys, according to one embodiment of the disclosure;

FIG. 5 illustrates exemplary pseudo code for ECDSA key blinding process 500, according to at least one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for protection of private keys in message signing based on elliptic curve cryptography.

In one or more embodiments, blinding techniques are provided for the protection of private keys in message signing based on elliptic curve cryptography. An internal public key within the ECDSA algorithm is computed as a point on the elliptic curve using a scalar multiply operation based on (i) an internal private key blinded using a random blinding value, (ii) a base point of the elliptic curve, and (iii) an inverse value for the random blinding value added to a result of the scalar multiply operation.

Figure 1:
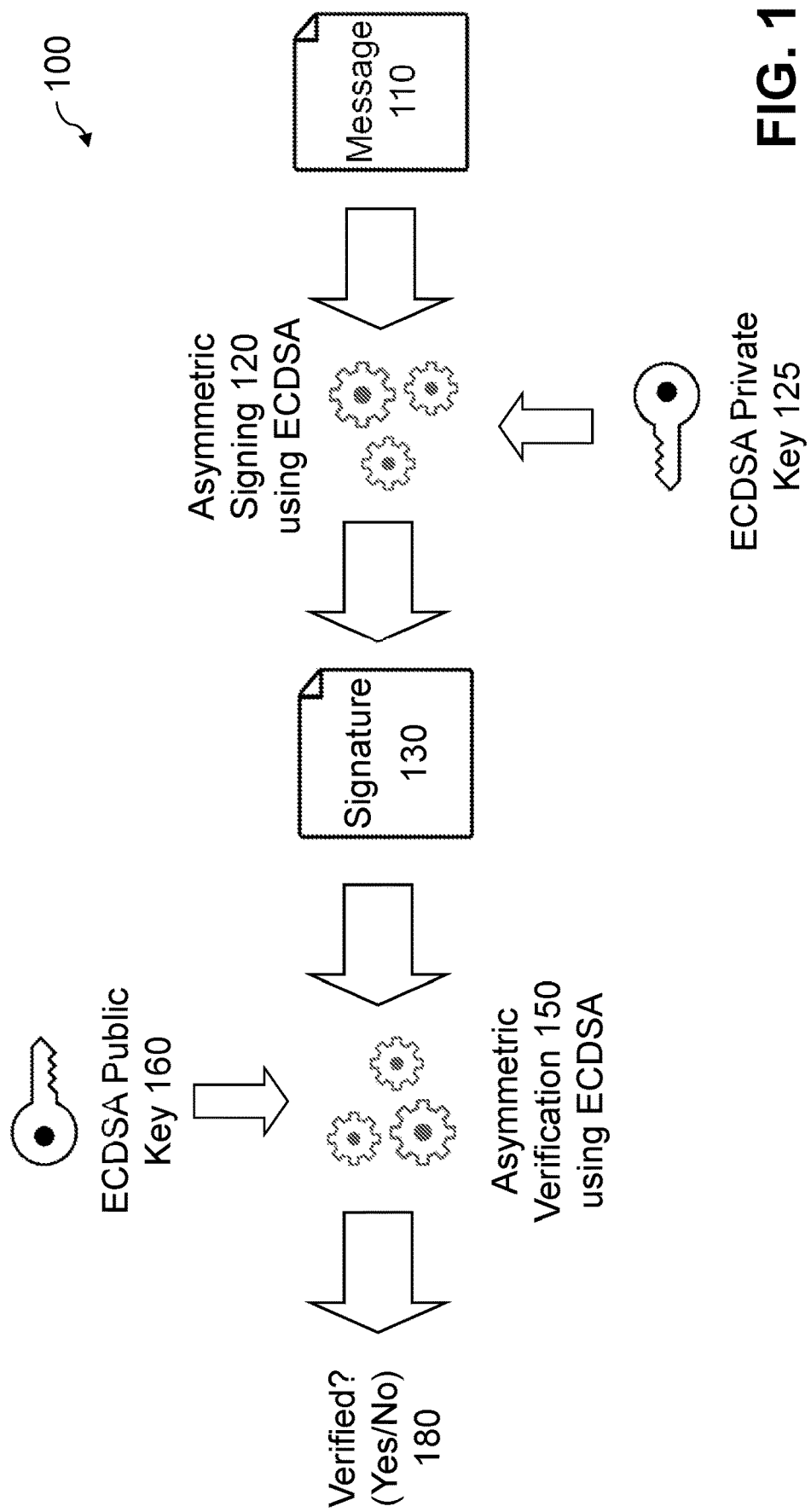
FIG. 1 illustrates an exemplary message signing process according to one implementation of the Elliptic Curve Digital Signature Algorithm (ECDSA)

FIG. 1 illustrates an exemplary message signing process 100 according to one implementation of the ECDSA. As shown in FIG. 1, a message 110, such as a plain text message, is applied to an asymmetric signing module 120 to create a signature 130. The asymmetric signing module 120 employs ECDSA and an ECDSA private key 125 of the message signer. This ECDSA private key 125 is input to the asymmetric signing module 120, as represented in FIG. 1 by the gears, and combined with the message 110 to produce the signature 130.

The ECDSA signature generation algorithm implemented by the asymmetric signing module 120 of FIG. 1 can be expressed as follows:

1. Select a random integer k, $1<=k=n-1$.
2. Compute $kG=(x_1, y_1)$ and convert $x_1$ to an integer $\bar{x}_1$.
3. Compute $r=\bar{x}_1$ mod n. If r=0 go to step 1.
4. Compute $k^{-1}$ mod n.
5. Compute DIGEST(m) and convert this bit string to an integer e.
6. Compute $s=k^{-1}(e+dr)$ mod n. If s=0 then go to step 1.

7. Signature for the message, m, is (r, s).

where:
- G is a base point on the elliptic curve;
- n is the order of G;
- m is the message 110;
- d is the ECDSA private key 125 of the message signer;
- k is an internal private key; and
- kG is an internal public key.

Steps 1 and 2 of the above ECDSA signature generation algorithm are referred to herein as ECDSA key generation steps, as discussed further below in conjunction with FIG. 2. Generally, the resulting key pair that is created in steps 1 and 2 will be referred to as an internal key pair (internal private key and internal public key). This is to differentiate from the key pair used in the overall ECDSA sign and verify operations of FIG. 1 (ECDSA private key 125 and ECDSA public key 160).

As shown in FIG. 1, a recipient of the signature 130 can then optionally verify the received message 110 by applying the signature 130 to an asymmetric verification module 150 that employs ECDSA and an ECDSA public key 160 of the message signer. The asymmetric verification module 150 provides an indication 180 of whether or not the received message 110 is verified.

Figure 2:
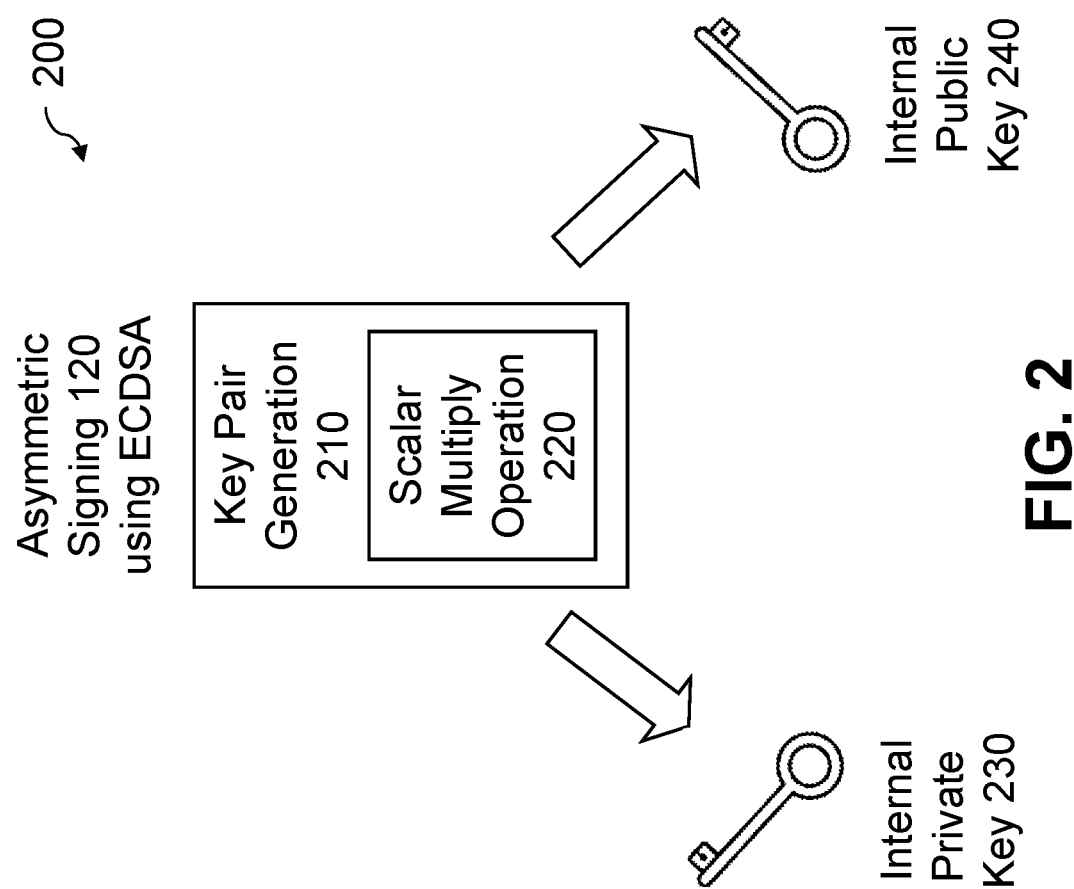
FIG. 2 illustrates an exemplary key generation process according to one implementation of ECDSA.

FIG. 2 illustrates an exemplary key generation process 200 according to one implementation of ECDSA. Generally, the exemplary key generation process 200 of FIG. 2 operates within the asymmetric signing module 120 of FIG. 1 (Steps 1 and 2) to generate an internal key pair comprising an internal private key 230 and an internal public key 240 using a key pair generation module 210.

As shown in FIG. 2, the key pair generation module 210 uses a scalar multiply operation 220 (Step 2) to calculate a new internal public key 240 from the given ECDSA private key 125 (FIG. 1) of the message signer. One or more aspects of the present disclosure recognizes that the scalar multiply operation 220 (the internal private key, k, multiplied by the base point on the elliptic curve, G) is vulnerable to side channel attacks (e.g., timing analysis attacks and/or power analysis attacks of the scalar multiply operation 220 by a fraudster). It is important to keep the k value secret because if an attacker can retrieve k from a side-channel attack, d, the given ECDSA private key 125 of the message signer, can also be compromised due to it being the only unknown in the signature calculation. One or more aspects of the present disclosure recognize that to remain secure, k and d must both be kept secret.

In one or more embodiments, the present disclosure avoids using the internal EC private key value directly when calculating the public point, as discussed below. It is noted that the disclosed ECC blinding techniques are independent of normal integer blinding (scalar*scalar), that would be used to protect the dr modular multiplication in Step 6. Normal integer blinding is also often used to protect against side-channel attacks in modular exponentiation for algorithms such as the RSA algorithm, as would be apparent to persons of ordinary skill in the art.

Figure 3:
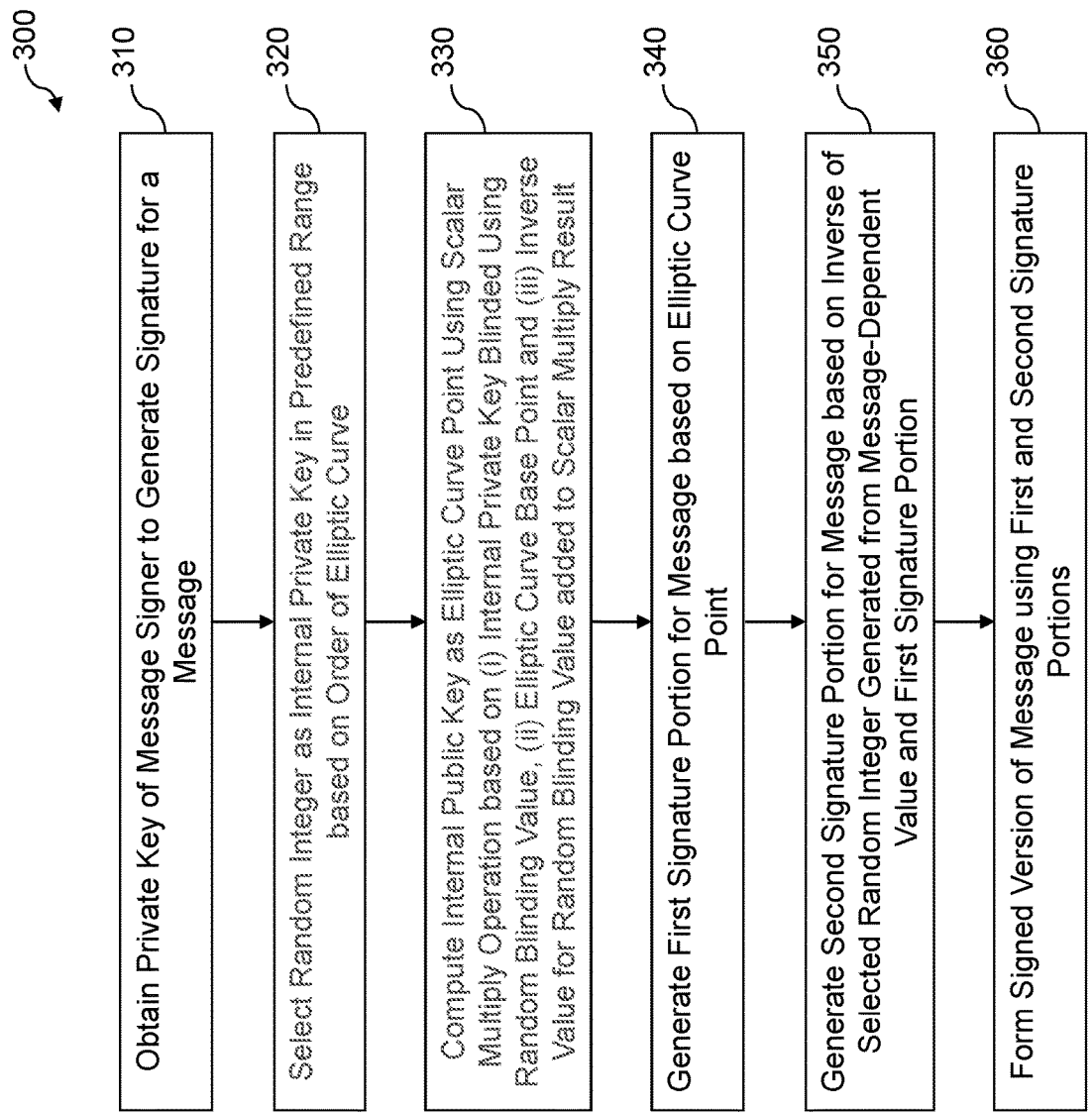
FIG. 3 is a flow chart illustrating an exemplary implementation of a message signing process based on elliptic curve cryptography with the disclosed techniques for protection of private keys, according to some embodiments of the disclosure.

FIG. 3 is a flow chart illustrating an exemplary implementation of a message signing process 300 based on elliptic curve cryptography with the disclosed blinding techniques for protection of private keys, according to some embodiments of the disclosure. As shown in FIG. 3, the exemplary message signing process 300 obtains a private key of a message signer to generate a signature for a message during step 310 and then selects a random integer, k, as an internal private key in a predefined range based on an order of an elliptic curve during step 320. As used herein, the term "random" selection shall be construed to include a pseudo-random selection, as well as a substantially random selection.

Thereafter, an internal public key is computed during step 330 as a point on the elliptic curve using a scalar multiply operation based on (i) the internal private key blinded using a random blinding value, (ii) a base point of the elliptic curve, and (iii) an inverse value for the random blinding value added to a result of the scalar multiply operation. A first signature portion is generated for the message during step 340 based on the point of the elliptic curve. A second signature portion is generated for the message during step 350 based on an inverse of the selected random integer generated from a message-dependent value of the message and the first signature portion. As used herein, the term "based on" shall be construed to encompass when a first item is based "at least in part" on a second item.

Finally, the exemplary message signing process 300 forms a signed version of the message during step 360 using the first and second signature portions.

FIG. 4 illustrates exemplary pseudo code for a message signing process 400 based on elliptic curve cryptography with the disclosed techniques for protection of private keys, according to one embodiment of the disclosure. Generally, the exemplary message signing process 400 of FIG. 4 modifies the ECDSA algorithm discussed above, such that the kG scalar multiply value is calculated using blinding to protect the k value.

As shown in FIG. 4, the exemplary ECDSA message signing process 400 with blinding protection initially sets selects a random integer k during step 1 in a range between 1 and n−1 (where n is the EC order). A next blinding value $i_N$ is computed in Step 1A based on a doubling of a prior blinding value, $i_{N-1}$, as follows:

$$i_N = i_{N-1} * 2 \bmod n.$$

A next blinding inverse value is computed in Step 1B based on a doubling of a prior blinding inverse value, as follows:

$$I_N = I_{N-1} * 2.$$

It is noted that calculation of the initial blinding values is discussed further below in conjunction with FIG. 5.

A blinded internal private key $k_b$ is computed in Step 1C by adding the current blinding value $i_N$ (modulo n) to the selected random integer k (private scalar), as follows:

$$k_b = k + i_N \bmod n.$$

A blinded public value $Q_b$ is computed in Step 1D by multiplying the blinded internal private key $k_b$ (blinded private scalar) by a base point of the elliptic curve, as follows:

$$Q_b = k_b * G.$$

The internal public key value kG is computed in Step 2 based on the next blinding inverse value for the random blinding value added to the $Q_b$ result of the scalar multiply operation, as follows:

$$kG = Q_b + I_N = (x_1, y_1) \text{ and convert } x_1 \text{ to an integer } x_1.$$

A first part r of the signature for the message is computed in Step 3, as follows:

$$r = x_1 \bmod n. \text{ If } r = 0 \text{ go to step 1.}$$

A value $k^{-1} \bmod n$ is computed in Step 4.

A message-dependent value of the message, such as a digest or a hash value, is computed in Step 5, as follows:

DIGEST(m) and convert this bit string to an integer e.

A second part s of the signature for the message is computed in Step 6, as follows:

$$s = k^{-1}(e+dr) \bmod n. \text{ If } s=0, \text{ then go to step 1.}$$

Finally, the signature for the message m is formed in Step 7, as (r, s).

FIG. 5 illustrates exemplary pseudo code for ECDSA key blinding process 500, for use by the exemplary ECDSA message signing process 400 of FIG. 4 with blinding protection, according to at least one embodiment of the disclosure. As shown in FIG. 5, an initial blinding value, i, is initially selected by selecting a random number between 0 and the EC order, n, minus one.

An initial blinding inverse point, I, is then calculated by negating the result of the EC base point G, multiplied with the initial blinding value i, as follows:

$$I_1 = (G*i)^{-1},$$

where G is the base point of the EC curve, and i is the initial blinding value. * denotes scalar multiplication.

Thereafter, the next blinding values may either be generated randomly by following the first step again, or by deriving new blinding values from the initial values. Derived blinding values are obtained by "squaring" the initial values. For ECC, this is performed by doubling the scalar value and point value in their respective fields, as follows:

The next blinding value, $i_{N+1}$, is calculated by taking the current blinding value multiplied by two, modulo n, as follows:

$$i_{N+1} = i_N * 2 \bmod n.$$

The next blinding inverse point, $I_{N+1}$, is calculated by doubling the existing blinding inverse point using ECC scalar multiplication, as follows:

$$I_{N+1} = I_N * 2.$$

Among other benefits, the disclosed techniques for the protection of private keys in message signing based on elliptic curve cryptography only provide a fraudster or another attacker with access to the blinded private value, $k_b$, not the real private value, k. It is again noted that it is important to keep the k value secret because if an attacker can retrieve k from a side-channel attack, d, the private key of the message signer, is also compromised due to it being the only unknown in the signature calculation. Thus, k and d must both be kept secret to maintain security.

For a more detailed discussion of the ECDSA message signing algorithm, see, for example, Accredited Standards Committee X9, American National Standard X9, 62-2005, Public Key Cryptography for the Financial Services Industry, The Elliptic Curve Digital Signature Algorithm (ECDSA), Nov. 16, 2005, and/or T. Pornin, "Deterministic Usage of the Digital Signature Algorithm (DSA) and Elliptic Curve Digital Signature Algorithm (ECDSA)," Request for Comments: 6979 (August 2013) (downloadable from https://www.ietf org/rfc/rfc6979.txt), each incorporated by reference herein in its entirety.

One or more embodiments of the disclosure provide improved methods, apparatus and computer program products for protection of private keys in message signing based on elliptic curve cryptography. The foregoing applications and associated embodiments should be considered as illustrative only, and numerous other embodiments can be configured using the techniques disclosed herein, in a wide variety of different applications.

It should also be understood that the disclosed blinded message signing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for protection of private keys in message signing based on elliptic curve cryptography may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based blinded message signing engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based blinded message signing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
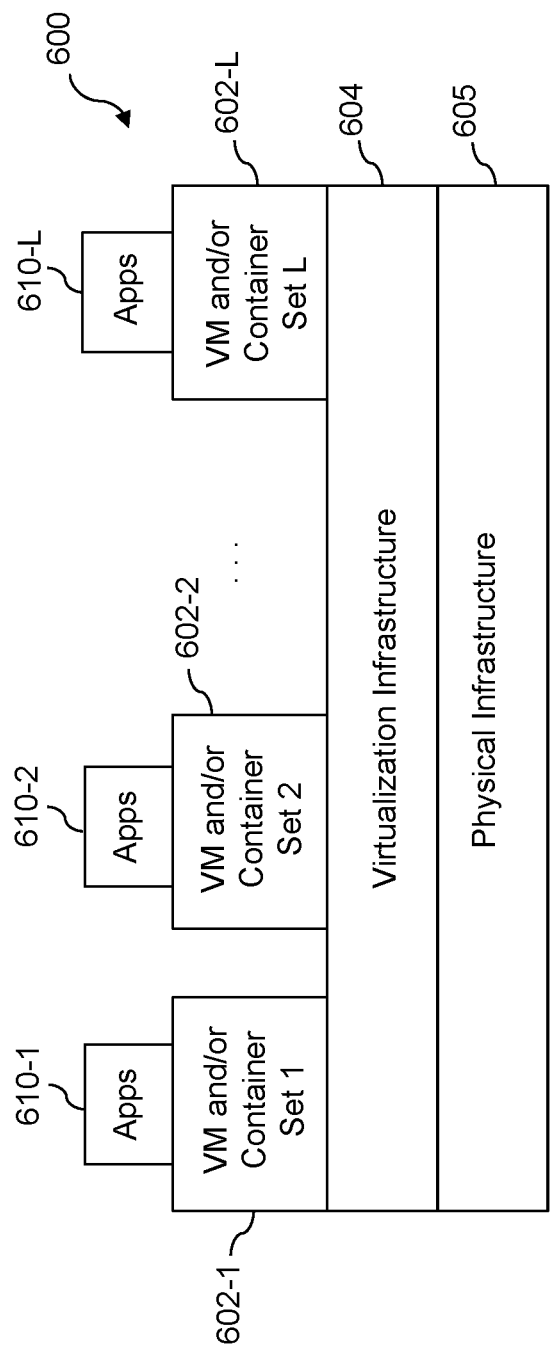
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of an information processing system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide blinded message signing functionality of the type described above for one or more processes running on a given one of the VMs. For example, each of the VMs can implement blinded message signing control logic and associated key generation functionality for the protection of private keys in message signing based on elliptic curve cryptography for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide blinded message signing functionality of the type described above for one or more processes running on different ones of the containers. For example, a container host device supporting multiple containers of one or more container sets can implement one or more instances of blinded message signing control logic and associated key generation functionality for the protection of private keys in message signing based on elliptic curve cryptography.

As is apparent from the above, one or more of the processing modules or other components employed by the message signing process 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
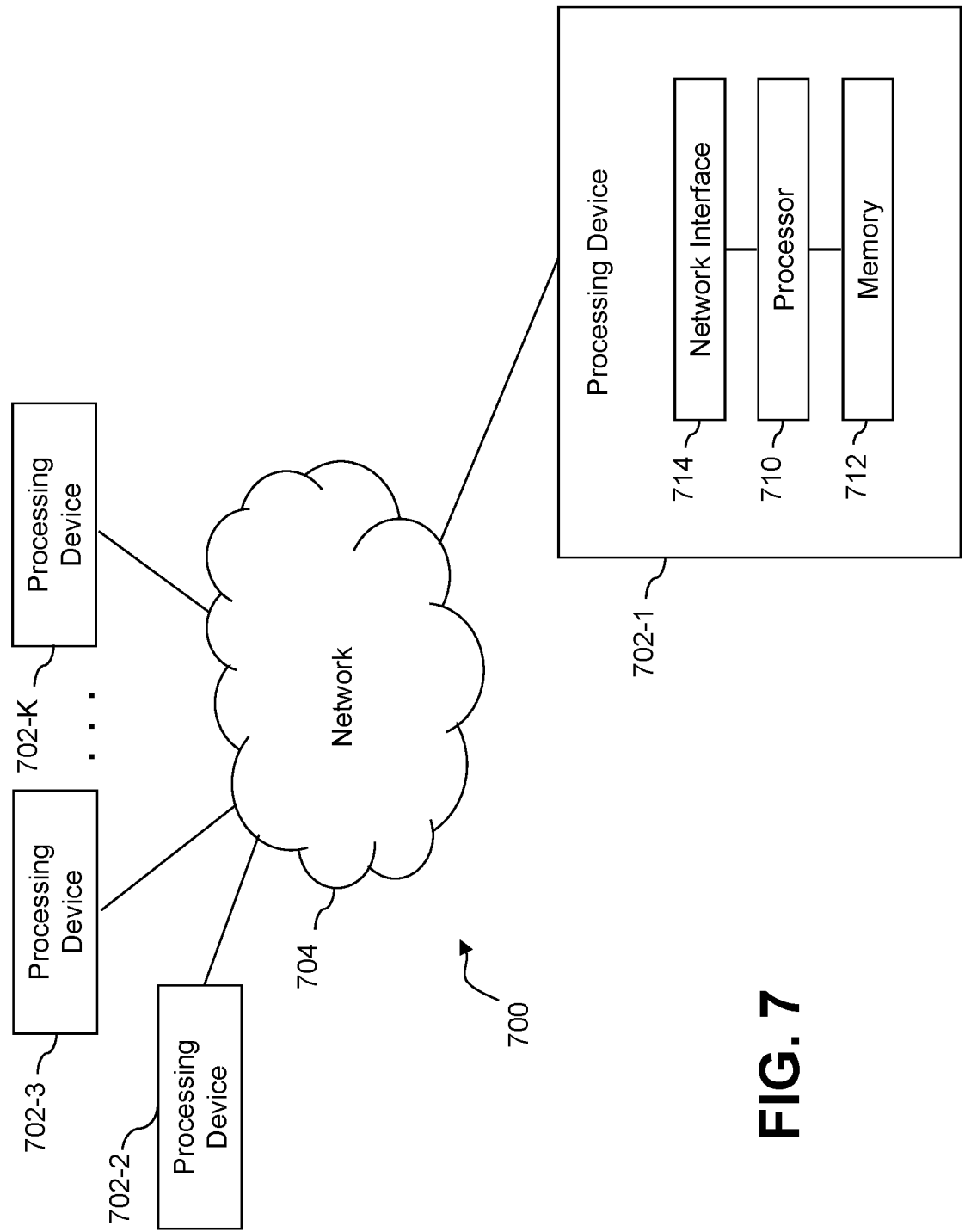
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a private key of a message signer to generate a signature for a message;
    selecting a random integer as an internal private key in a predefined range based at least in part on an order of an elliptic curve;
    computing an internal public key as a point on the elliptic curve using (a) a scalar multiply operation based at least in part on (i) the internal private key blinded using a random blinding value and (ii) a base point of the elliptic curve, and (b) a first inverse value for the random blinding value added to a result of the scalar multiply operation;
    generating a first part of the signature for the message based at least in part on the point of the elliptic curve;
    generating a second part of the signature for the message based at least in part on a second inverse value of the selected random integer generated from a message-dependent value of the message and the first part of the signature; and
    forming a signed version of the message using the first part of the signature and the second part of the signature,
    wherein the method is performed by at least one processing device comprising a processor coupled to a memory.

2. The method of claim 1, wherein the predefined range based on the order of the elliptic curve is a range between 0 and the order minus one.

3. The method of claim 1, wherein the computing further comprises computing a next blinding value, $i_N$, based on a doubling of a prior blinding value, $i_{N-1}$;
    and computing a next blinding inverse value, $I_N$, for the next blinding value based on a doubling of a prior blinding inverse value, $I_{N-1}$.

4. The method of claim 3, wherein the computing further comprises blinding the internal private key based on an addition of the next blinding value, $i_N$, to the internal private key.

5. The method of claim 1, wherein the generating the first part of the signature for the message based on the point of the elliptic curve applies an operation to an integer version of one coordinate of the point of the elliptic curve.

6. The method of claim 1, wherein the generating the second part of the signature for the message further comprises multiplying the first part of the signature by a private key of the message signer and adding a result to the message-dependent value of the message.

7. The method of claim 1, further comprising verifying the message by extracting one or more of the first part of the signature and the second part of the signature from the signed version of the message.

8. The method of claim 1, wherein the message-dependent value comprises one or more of a digest of the message and a hash of the message.

9. A computer program product, comprising a tangible machine-readable storage medium having encoded therein executable code of one or more software programs, wherein the one or more software programs when executed by at least one processing device perform the following steps:
    obtaining a private key of a message signer to generate a signature for a message;
    selecting a random integer as an internal private key in a predefined range based at least in part on an order of an elliptic curve;
    computing an internal public key as a point on the elliptic curve using (a) a scalar multiply operation based at least in part on (i) the internal private key blinded using a random blinding value and (ii) a base point of the elliptic curve, and (b) a first inverse value for the random blinding value added to a result of the scalar multiply operation;
    generating a first part of the signature for the message based at least in part on the point of the elliptic curve;
    generating a second part of the signature for the message based at least in part on a second inverse value of the selected random integer generated from a message-dependent value of the message and the first part of the signature; and
    forming a signed version of the message using the first part of the signature and the second part of the signature.

10. The computer program product of claim 9, wherein the computing further comprises computing a next blinding value, $i_N$, based on a doubling of a prior blinding value, $i_{N-1}$; and computing a next blinding inverse value, $I_N$, for the next blinding value based on a doubling of a prior blinding inverse value, $I_{N-1}$.

11. The computer program product of claim 10, wherein the computing further comprises blinding the internal private key based on an addition of the next blinding value, $i_N$, to the internal private key.

12. The computer program product of claim 9, wherein the generating the first part of the signature for the message based on the point of the elliptic curve applies an operation to an integer version of one coordinate of the point of the elliptic curve.

13. The computer program product of claim 9, wherein the generating the second part of the signature for the message further comprises multiplying the first part of the signature by a private key of the message signer and adding a result to the message-dependent value of the message.

14. The computer program product of claim 9, wherein the message-dependent value comprises one or more of a digest of the message and a hash of the message.

15. An apparatus, comprising:
a memory; and
at least one processing device, coupled to the memory, operative to implement the following steps:
obtaining a private key of a message signer to generate a signature for a message;
selecting a random integer as an internal private key in a predefined range based at least in part on an order of an elliptic curve;
computing an internal public key as a point on the elliptic curve using (a) a scalar multiply operation based at least in part on (i) the internal private key blinded using a random blinding value and (ii) a base point of the elliptic curve, and (b) a first inverse value for the random blinding value added to a result of the scalar multiply operation;
generating a first part of the signature for the message based at least in part on the point of the elliptic curve;
generating a second part of the signature for the message based at least in part on a second inverse value of the selected random integer generated from a message-dependent value of the message and the first part of the signature; and
forming a signed version of the message using the first part of the signature and the second part of the signature.

16. The apparatus of claim 15, wherein the computing further comprises computing a next blinding value, $i_N$, based on a doubling of a prior blinding value, $i_{N-1}$; and computing a next blinding inverse value, $I_N$, for the next blinding value based on a doubling of a prior blinding inverse value, $I_{N-1}$.

17. The apparatus of claim 16, wherein the computing further comprises blinding the internal private key based on an addition of the next blinding value, $i_N$, to the internal private key.

18. The apparatus of claim 15, wherein the generating the first part of the signature for the message based on the point of the elliptic curve applies an operation to an integer version of one coordinate of the point of the elliptic curve.

19. The apparatus of claim 15, wherein the generating the second part of the signature for the message further comprises multiplying the first part of the signature by a private key of the message signer and adding a result to the message-dependent value of the message.

20. The apparatus of claim 15, wherein the message-dependent value comprises one or more of a digest of the message and a hash of the message.

* * * * *